(12) United States Patent
Umetani

(10) Patent No.: US 12,530,507 B2
(45) Date of Patent: Jan. 20, 2026

(54) MACHINE LEARNING THREE-DIMENSIONAL FLUID FLOWS FOR INTERACTIVE AERODYNAMIC DESIGN

(71) Applicant: AUTODESK, INC., San Francisco, CA (US)

(72) Inventor: Nobuyuki Umetani, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 240 days.

(21) Appl. No.: 16/987,270

(22) Filed: Aug. 6, 2020

(65) Prior Publication Data

US 2020/0364388 A1 Nov. 19, 2020

Related U.S. Application Data

(63) Continuation of application No. 15/676,941, filed on Aug. 14, 2017, now Pat. No. 10,740,509.

(51) Int. Cl.
| | |
|---|---|
| *G06F 7/48* | (2006.01) |
| *G06F 30/20* | (2020.01) |
| *G06N 3/02* | (2006.01) |
| *G06N 3/04* | (2023.01) |
| *G06T 17/20* | (2006.01) |

(Continued)

(52) U.S. Cl.
CPC ............... *G06F 30/20* (2020.01); *G06N 3/02* (2013.01); *G06N 3/04* (2013.01); *G06T 17/20* (2013.01); *G06T 19/20* (2013.01); *G06F 2111/10* (2020.01)

(58) Field of Classification Search
CPC ....... G06F 30/20; G06F 2111/10; G06N 3/02; G06N 3/04; G06N 3/084; G06N 3/0454; G06T 17/20; G06T 19/20
See application file for complete search history.

(56) References Cited

U.S. PATENT DOCUMENTS

| | | |
|---|---|---|
| 2014/0028673 A1 | 1/2014 | Gregson et al. |
| 2016/0240001 A1 | 8/2016 | Sheffer et al. |

(Continued)

OTHER PUBLICATIONS

Baris, Onur, and Fred Mendonc, a. "Automotive turbocharger compressor CFD and extension towards incorporating installation effects." Turbo Expo: Power for Land, Sea, and Air. vol. 54679. 2011.*

(Continued)

*Primary Examiner* — Nithya J. Moll
(74) *Attorney, Agent, or Firm* — Artegis Law Group, LLP

(57) ABSTRACT

Embodiments of the invention disclosed herein provide techniques for simulating a three-dimensional fluid flow. A parameterization application parameterizes a first representation of a design object to compute a first polycube representation. The parameterization application computes a first distortion grid based on the first polycube representation. A machine learning application computes, via a first neural network, a surface pressure model based on the first polycube representation. The machine learning application computes, via a second neural network, a velocity field model based on the first polycube representation and the first distortion grid. The machine learning application generates a visualization of the surface pressure model and the velocity field model for display on a display device.

20 Claims, 8 Drawing Sheets

(51) Int. Cl.
G06T 19/20 (2011.01)
G06F 111/10 (2020.01)

(56) References Cited

U.S. PATENT DOCUMENTS

2017/0024931 A1   1/2017  Sheffer et al.
2018/0335018 A1*  11/2018 Cao .................... G05B 23/0286

OTHER PUBLICATIONS

Angeletti, Mario, et al. "The role of CFD on the aerodynamic investigation of motorcycles." SAE transactions (2003): 1103-1111.*
Guo, Xiaoxiao, Wei Li, and Francesco Iorio. "Convolutional neural networks for steady flow approximation." Proceedings of the 22nd ACM SIGKDD international conference on knowledge discovery and data mining. 2016.*
Rajan, Anurag. "Effect of mesh distortion on the accuracy of high order vorticity-velocity CFD approaches." (2011).*
Chang, Chin-Chen, and Chen-Yu Lin. "Texture tiling on 3d models using automatic polycube-maps and wang tiles." Journal of Information Science and Engineering 26.1 (2010): 291-305.*
Großmann, David, et al. "Isogeometric simulation of turbine blades for aircraft engines." Computer Aided Geometric Design 29.7 (2012): 519-531.*
Faller, William E., and Scott J. Schreck. "Unsteady fluid mechanics applications of neural networks." Journal of aircraft 34.1 (1997): 48-55.*
Snyder, Deryl, Evangelos Koutsavdis, and John Anttonen. "Transonic store separation using unstructured CFD with dynamic meshing." 33rd AIAA fluid dynamics conference and exhibit. 2003.*
Gregson, James, Alla Sheffer, and Eugene Zhang. "All-hex mesh generation via volumetric polycube deformation." Computer graphics forum. vol. 30. No. 5. Oxford, UK: Blackwell Publishing Ltd, 2011.*
Yu, Wuyi, et al. "Optimizing polycube domain construction for hexahedral remeshing." Computer-Aided Design 46 (2014): 58-68.*
DeRose, Tony, Michael Kass, and Tien Truong. "Subdivision surfaces in character animation." Proceedings of the 25th annual conference on Computer graphics and interactive techniques. 1998.*
Tarini, Marco, et al. "Polycube-maps." ACM transactions on graphics (TOG) 23.3 (2004): 853-860.*
Guo et al., "Convolutional Neural Networks for Steady Flow Approximation", KDD 2016 Conference proceedings:ACM SIGKDD Conference on Knowledge Discovery and Data Mining, https://autodeskresearch.com/publications/convolutional-networks-steady-flow-approximation, Aug. 13-17, 2016, 10 pages.
Bonev et al., "Pre-Computed Liquid Spaces with Generative Neural Networks and Optical Flow", ArXiv e-prints {Apr. 2017). arXiv:cs. GR/1704.07854, Apr. 25, 2017, 15 pages.
Chu et al., "Data-Driven Synthesis of Smoke Flows with CNN-based Feature Descriptors", Transaction on Graphics (SIGGRAPH), ACM Transactions on Graphics, vol. 36, No. 4, Article 69, arXiv:1705. 01425v2, Jul. 25, 2017, 14 pages.
Cohen et al., "Interactive Fluid-Particle Simulation using Translating Eulerian Grids", In Proceedings of the 2010 ACM SIGGRAPH symposium on Interactive 3D Graphics and Games. ACM, Feb. 1, 2010, pp. 15-22.
De Witt et al., "Fluid Simulation Using Laplacian Eigenfunctions", https://doi.org/10.1145/2077341.2077351,ACM Transactions on Graphics, vol. 31, No. 1, Article 10, Jan. 2012, 11 pages.
Degener et al., "An Adaptable Surface Parameterization Method", In Proceedings of the 12th International Meshing Roundtable, Aug. 12, 2003, pp. 201-213.
Floater, Michael S., "Mean Value Coordinates", https://doi.org/10.1016/S0167-8396(02)00002-5, Computer Aided Geometric Design 20, 2003, pp. 19-27.
Floater et al., "Surface Parameterization: a Tutorial and Survey", In Advances in multiresolution for geometric modelling, 2005, pp. 157-186.
Hornik, Kurt, "Approximation Capabilities of Multilayer Feedforward Networks", https://doi.org/10.1016/0893-6080(91)90009-T, Neural Networks, vol. 4, Mar. 1991, pp. 251-257.
Ju et al., "Mean Value Coordinates for Closed Triangular Meshes", https://doi.org/10.1145/1073204.1073229. ACM Transactions on Graphics, vol. 24, No. 3, Jul. 2005, pp. 561-566.
Ladicky et al., "Data-driven Fluid Simulations Using Regression Forests", https://doi.org/10.1145/2816795.2818129, ACM Transactions on Graphics, vol. 34, No. 6, Article 199, Nov. 2015, pp. 199:1-199:9.
Martin et al., "OmniAD: Data-driven Omni-directional Aerodynamics", hllps://doi.org/10.1145/2766919. ACM Transactions on Graphics, vol. 34, No. 4, Article 113, Aug. 2015, pp. 113:1-113:12.
Stanton et al., "Self-Refining Games using Player Analytics", https://doi.org/10.1145/2601097.2601196, ACM Transactions on Graphics, vol. 33, No. 4, Article 73, Jul. 2014, pp. 73:1-73:9.
Stanton et al., "Non-Polynomial Galerkin Projection on Deforming Meshes", https://doi.org/10.1145/2461912.2462006. ACM Transactions on Graphics, vol. 32, No. 4, Article 86, Jul. 2013, pp. 86:1-86:13.
Su et al., "Multi-view Convolutional Neural Networks for 3D Shape Recognition", In Proceedings of the 2015 IEEE Intrnational Conference on Computer Vision {ICCV) {ICCV '15), hllps://doi.org/10.1109/ICCV.2015.114. IEEE Computer Society, Washington, DC, USA, 2015, pp. 945-953.
Tarini et al., "PolyCube-Maps", https://doi.org/10.1145/1015706. 1015810. ACM Transactions on Graphics, vol. 23, No. 3, Aug. 2004, pp. 853-860.
Tompson et al., "Accelerating Eulerian Fluid Simulation with Convolutional Networks", arXiv:1607.03597v6 [cs.CV], Jun. 22, 2017, 10 pages.
Treuille et al., "Model Reduction for Real-time Fluids", https://doi.org/10.1145/1141911.1141962. ACM Transactions on Graphics, vol. 25, No. 3, Jul. 2006, pp. 826-834.
Um et al., "Liquid Splash Modeling with Neural Networks", arXiv:1704. 04456v2 [cs.GR], Jun. 26, 2018, 12 pages.
Umetani et al., "Pteromys: Interactive Design and Optimization of Free-formed Free-flight Model Airplanes", https://:doi.org/10.1145/2601097.2601129. ACM Transactions on Graphics, vol. 33, No. 4, Article 65, Jul. 2014, pp. 65:1-65:10.
Wicke et al., "Modular Bases for Fluid Dynamics", https://doi.org/10.1145/1531326.1531345, ACM Transactions on Graphics, vol. 28, No. 3, Article 39, Aug. 2009, pp. 39-1:39-8.
Wu et al., "3D ShapeNets for 2.5D Object Recognition and Next-Best-View Prediction". CoRRabs/1406.5670 (2014), arXiv:1406. 5670v2 [cs.CV] Sep. 1, 2014, 9 pages.
Xu et al., "Data-Driven Shape Analysis and Processing", http://dx.doi.org/10.1145/2988458.2988473, In SIGGRAPH Asia 2016 Courses, ACM, Dec. 5-8, 2016, 38 pages.
Balafas, Georgios, "Polyhedral mesh generation for CFO-analysis of complex structures", Diplomityo, Munchenin teknillinen yliopisto (2014).
Han, Shuchu, Jiazhi Xia, and Ying He. "Hexahedral shell mesh construction via volumetric polycube map", Proceedings of the 14th ACM symposium on solid and physical modeling. 2010.
Dhibi, Naziha, et al. "3D high resolution mesh deformation based on multi library wavelet neural network architecture", BD Research 7.4 (2016): 31.
Sosnowski, Marcin, Jaroslaw Krzywanski, and Renata Gnatowska. "Polyhedral meshing as an innovative approach to computational domain discretization of a cyclone in a fluidized bed CLC unit." E3S Web of Conferences. vol. 14. EDP Sciences, 2017.

* cited by examiner

MACHINE LEARNING THREE-DIMENSIONAL FLUID FLOWS FOR INTERACTIVE AERODYNAMIC DESIGN

CROSS-REFERENCE TO RELATED APPLICATIONS

This application is a continuation of the co-pending U.S. patent application titled, "MACHINE LEARNING THREE-DIMENSIONAL FLUID FLOWS FOR INTERACTIVE AERODYNAMIC DESIGN," filed on Aug. 14, 2017 and having Ser. No. 15/676,941. The subject matter of this related application is hereby incorporated herein by reference.

BACKGROUND OF THE INVENTION

Field of the Invention

The present invention relates generally to computational flow dynamics (CFD) and, more specifically, to machine learning three-dimensional fluid flows for interactive aerodynamic design.

Description of the Related Art

In the field of field of engineering and computational fabrication, fluid flow simulation is often employed by engineers and designers for the purpose of design evaluation and optimization. One such fluid simulation technique is referred to herein as "computational fluid dynamics" (CFD). Via techniques such as CFD, engineers and designers can simulate the flow of a fluid, such as a liquid or gas, around an arbitrary object. These objects are referred to herein as "design objects." A proper CFD simulation enables the engineer or designer to view the velocity field of the fluid around the design object over a period of time as well as the pressure applied by the fluid on the surface of the object over that same period of time. During the design phase, the engineer or designer can modify the shape of the design object, perform a CFD simulation, and then repeat these steps until the shape of the design object meets the applicable specifications or design goals. As a general matter, CFD is implemented to improve the aerodynamics of cars, airplanes and other vehicles; refine airflows for heating, ventilation, and air conditioning systems during architectural planning; and optimize manufacturing molds for casting, injection molding, and other manufacturing processes.

One drawback to implementing CFD in the design process is that CFD is computationally expensive and complex and quite time consuming. As is well-understood, a proper CFD analysis typically involves repetitively solving a system of complex equations with many degrees of freedom over many time steps. As one example, a CFD fluid simulation for a particular design object could involve computing a velocity field and surface pressure over a period of 1000 time steps, where each time step consumes about one second of compute time. Based on these parameters a single CFD fluid simulation would require between 16 to 17 minutes to execute completely. Further, each time the shape of the design object is changed during the design process, another 16 to 17 minutes would be needed to execute the related CFD simulation. As a result, iteratively optimizing the shape of the design object via CFD would take hours or even more than a day to complete.

As the foregoing illustrates, what is needed in the art are more effective techniques for simulating fluid flows around objects during the design process.

SUMMARY OF THE INVENTION

Embodiments of the present application set forth a method for simulating a three-dimensional fluid flow. The method includes parameterizing a first representation of a design object to compute a first polycube representation. The method further includes computing a first distortion grid based on the first polycube representation. The method further includes computing, via a first neural network, a surface pressure model based on the first polycube representation. The method further includes computing, via a second neural network, a velocity field model based on the first polycube representation and the first distortion grid. The method further includes generating a visualization of the surface pressure model and the velocity field model for display on a display device.

Other embodiments of the present invention include, without limitation, a computer-readable medium including instructions for performing one or more aspects of the disclosed techniques, as well as a computing device for performing one or more aspects of the disclosed techniques.

One advantage of the disclosed techniques is that CFD simulation of fluid flows is computed at interactive speeds. As a result, engineers and designers can visualize the aerodynamic effects of changes to the shape of a design object in real-time or near real-time. In this manner, engineers and designers can more efficiently optimize the shape of a design object to meet particular aerodynamic design goals, relative to prior techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

Hardware Overview

Figure 1:
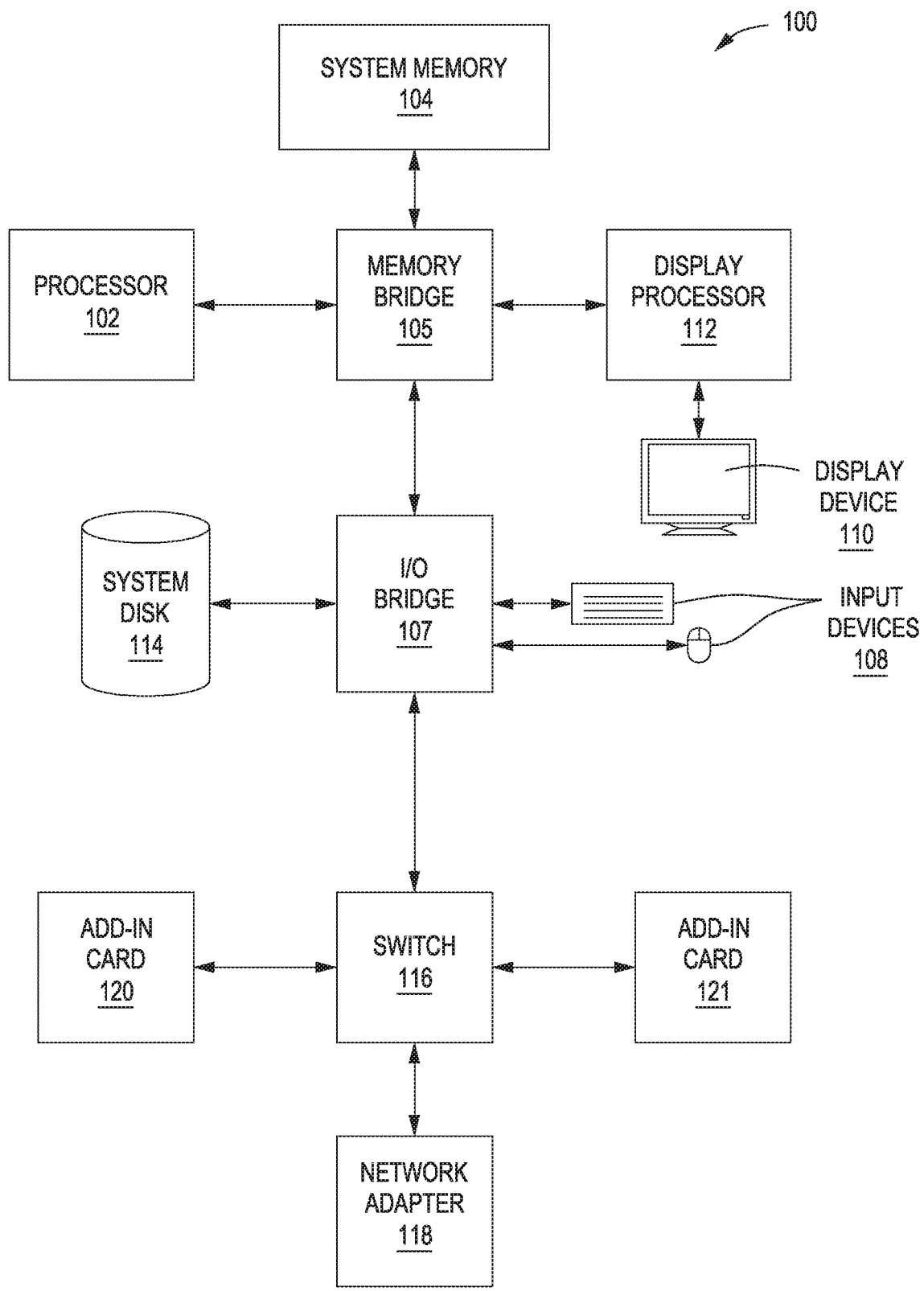
FIG. 1 is a block diagram illustrating a computer system configured to implement one or more aspects of the present invention.

FIG. 1 is a block diagram illustrating a computer system 100 configured to implement one or more aspects of the present invention. This figure in no way limits or is intended to limit the scope of the present invention. Computer system 100 may be a mainframe, minicomputer, personal computer, video game console, personal digital assistant, mobile phone, mobile device or any other device suitable for practicing one or more embodiments of the present invention.

As shown, computer system 100 includes, without limitation, a central processing unit (CPU) 102 and a system memory 104 communicating via a bus path that may include a memory bridge 105. CPU 102 includes one or more processing cores, and, in operation, CPU 102 is the master processor of computer system 100, controlling and coordinating operations of other system components. System memory 104 stores software applications and data for use by CPU 102. CPU 102 executes software applications and, optionally, an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computer system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computer system 100, via network adapter 118 or system disk 114. The render farm generates one or more rendered images of the scene using the provided instructions and/or data. These rendered images may be stored on computer-readable media in a digital format and optionally returned to computer system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Parameterization of Design Objects for Machine Learning Based CFD

Figure 2:
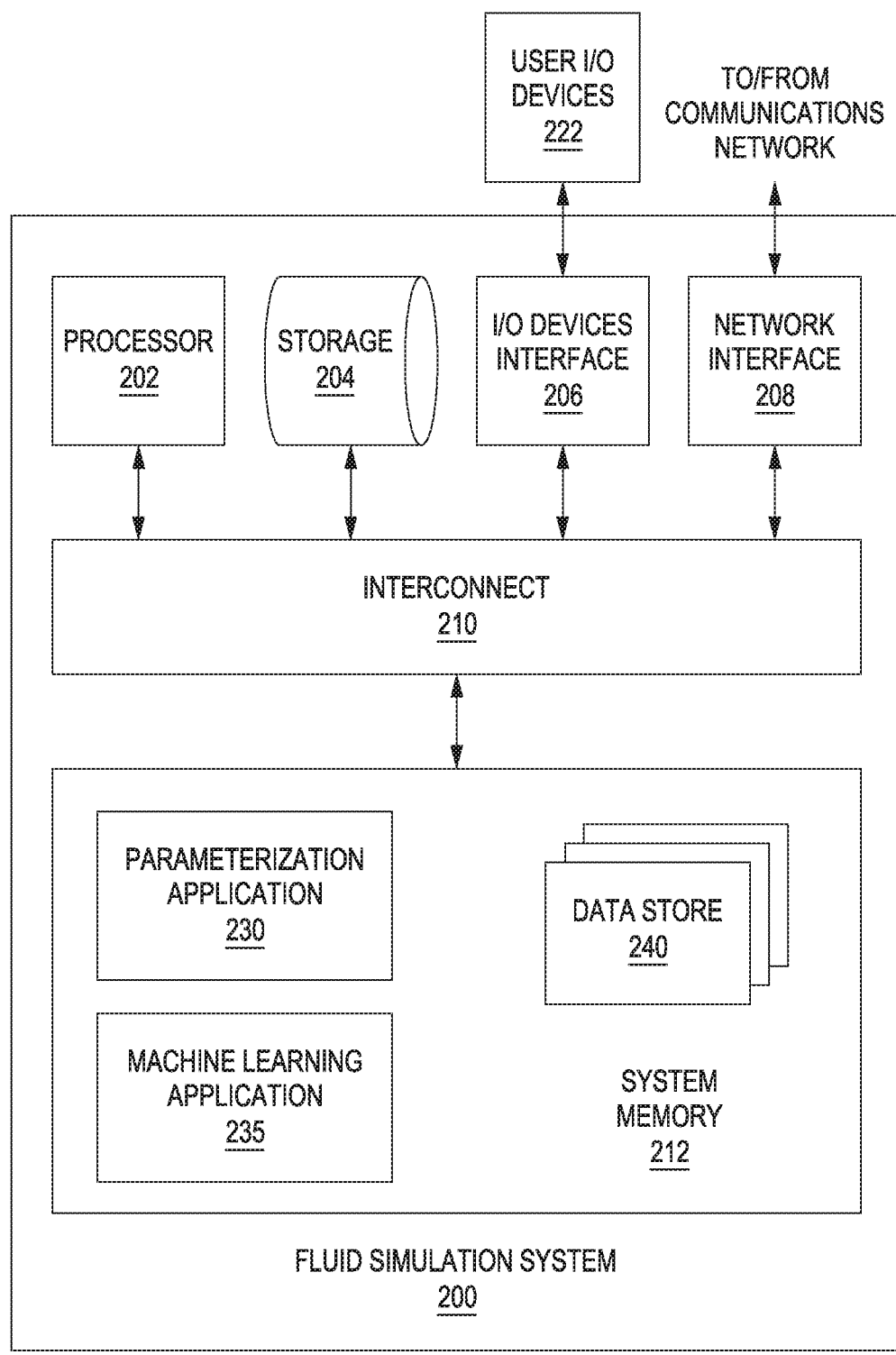
FIG. 2 is a block diagram of a fluid simulation system that can be implemented on the computer system of FIG. 1, according to various embodiments of the present invention.

FIG. 2 is a block diagram of a fluid simulation system 200 that can be implemented on the computer system 100 of FIG. 1, according to various embodiments of the present invention. As shown, the fluid simulation system 200 includes, without limitation, a processor 202, storage 204, an input/output (I/O) devices interface 206, a network interface 208, an interconnect 210, and a system memory 212. The computer system 100 of FIG. 1 can be configured to implement the fluid simulation system 200. The processor 202, storage 204, I/O devices interface 206, network interface 208, interconnect 210, and system memory 212 function substantially the same as described in conjunction with FIG. 1 except as further described below.

In general, processor 202 retrieves and executes programming instructions stored in system memory 212. Processor 202 may be any technically feasible form of processing device configured to process data and execute program code. Processor 202 could be, for example, a central processing unit (CPU), a graphics processing unit (GPU), an application-specific integrated circuit (ASIC), a field-programmable gate array (FPGA), and so forth. Processor 202 stores and retrieves application data residing in the system memory 212. Processor 202 is included to be representative of a single CPU, multiple CPUs, a single CPU having multiple processing cores, and the like. In operation, processor 202 is the master processor of fluid simulation system 200, controlling and coordinating operations of other system components. System memory 212 stores software applications and data for use by processor 202. Processor 202 executes software applications stored within system memory 212 and optionally an operating system. In particular, processor 202 executes software and then performs one or more of the functions and operations set forth in the present application.

The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network. Such a communications network broadly represents one or more LANs, WANs, cellular networks (e.g., LTE, HSPA, 3G, and other cellular technologies), and/or networks using any of wired, wireless, terrestrial microwave, or satellite links, and may include the public Internet.

The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

The system memory 212 includes, without limitation, a parameterization application 230, a machine learning application 235, and a data store 240. In operation, processor 202 executes parameterization application 230 and machine learning application 235 to perform one or more of the techniques disclosed herein.

Parameterization application 230 retrieves a representation of a design object from data store 240. Parameterization application 230 includes a shape editing interface that is similar to a computer-aided design (CAD) modeling interface. Via this shape editing interface, a user interactively edits the design object. The design object representation may be in any technically feasible format, including, without limitation, a boundary representation (b-rep), a triangle mesh representation, and a voxel representation. In some embodiments, the design object representation may be in a (b-rep) format, where the surfaces of a b-rep model are defined by patches of parametric surfaces. The shape editing interface supports direct manipulation of vertices and control points of the parametric surfaces. The user changes the topology of the b-rep, such as by inserting an edge inside a patch or by adding a control point to an edge of a patch.

During the design process, parameterization application 230 continuously receives updated velocity field and surface pressure data from machine learning application 235. In response, parameterization application 230, via the shape editing interface, displays the velocity field that surrounds the design object. The velocity field may be displayed via any technically feasible approach, including, without limitation, streamline visualization or advected particle animation. Concurrently, parameterization application 230, via the shape editing interface, displays the surface pressure exerted on the design object. Parameterization application 230 continuously updates the color contour on the surface of the design object to visualize the pressure. In addition, parameterization application 230 concurrently updates the value of the drag force, by computing the drag force based on the surface pressure data. In some embodiments, the shape editing interface of parameterization application 230 includes an interactive optimization function, referred to herein as "streamline brush." With the streamline brush function, the user moves a pointing device by making a scrubbing motion with the pointing device while simultaneously pressing a modifier key. In response, parameterization application 230, via the shape editing interface, modifies the geometry of the design object under the scrubbed region such that the drag force becomes smaller.

As the design object is edited or otherwise modified, parameterization application 230 converts the b-rep model, or other representation of the design object, into a parameterized model, as described herein. In the manner, the representation of the design object is prepared for machine learning application 235. In theory, multi-layer feed-forward neural networks, such as the neural networks included in machine learning application 235, are capable to approximate arbitrary multivariable functions, given a sufficient number of neurons and layers. However, in practice, b-rep models and other common object representations include high-dimensional functions with high degrees of nonlinearity. Representing such high-dimensional functions via a machine learning approach generally results in a neural network with an extremely large number of neurons. Typically, training such a large neural network may be difficult and time consuming. Consequently, parameterization application 230 parameterizes the design object according to three properties in order to constrain the size and complexity of the neural networks in machine learning application.

The first property is that the input vectors transmitted to the neural network and the output vectors generated by the neural network should have fixed dimensions. The second property is that the dimensions of the input vectors and output vectors for the neural network should be as small as feasibly possible. If the dimensions of the input vectors and output vectors are large, then more weight values need to be computed for the neural network. As a result, training the neural network to learn the weight values is more difficult and time consuming relative to neural networks whose input vectors and output vectors have smaller dimensions. The third property is that the input vectors and output vectors should change as linearly as possible while the shape of the design object is continuously edited or otherwise modified. This third property is desirable for achieving an as-linear-as-possible relationship between the input vectors and the output vectors in the neural network. In general, regression via a neural network is less complex and less time-consuming as the relationship between input vectors and output vectors approaches linearity.

In general, common representations for three-dimensional objects, such as b-rep models, triangle mesh representations, and voxel representations, lack one or more of these three properties. By contrast, parameterization application 230 parameterizes the design object to generate a representation that exhibits all three of these properties. In particular, parameterization application 230 parameterizes the design object according to a deforming volumetric grid rather than on a standard Cartesian volumetric grid.

As the design object is edited or otherwise modified, parameterization application 230 continuously deforms the volumetric grid on and around the shape of the design object to track the modifications to the design object. Therefore, the boundary of the design object does not cross grid points of the volumetric grid as the volumetric grid deforms in accordance with the modification of the design object. In this manner, parameterization application 230 minimizes the nonlinearity associated with the parameterization of the design object. More specifically, the deformation of the volumetric grid is uniquely determined by the modification of the surface grid on the design object. Therefore, parameterization application 230 defines the volumetric grid by specifying the values at corresponding grid points of the surface grid of the design object. In operation, parameterization application 230 first specifies a polycube map associated with the design object and then constructs a deforming volumetric grid based on the polycube map. This process is now described in further detail.

Parameterization application 230 retrieves an initial polycube model that approximates the shape of the design object. The initial polycube may be provided by a user or selected from a library of polycubes stored in data store 240. As further described herein, a polycube is a set of grid axis-aligned unit cubes that are connected face-to-face. With this initial polycube as a template, parameterization application 230 iteratively deforms and subdivides the polycube until the polycube matches the shape of the design object to a desired level of accuracy and precision. The displacements of the grid points on the surface of the polycube relative to the initial polycube define the parameterized shape. Parameterization application 230 transmits this parameterized shape to machine learning application 235 for evaluation.

In addition, parameterization application 230 employs the polycube to construct a deformed volumetric grid to parameterize the fluid field that surrounds the design object. First, parameterization application 230 adds additional cubes outside and around the initial polycube by creating a bounding box that contains the initial polycube and then filling in the space between the initial polycube and the bounding box with additional cubes, referred to herein as exterior cubes. Cubes that lie on the interior of the polycube are referred to herein as input cubes. Parameterization application 230 then deforms and subdivides the exterior cubes along with the input cubes within the polycube. The values at grid points of the exterior cubes define the velocity field surrounding the design object while the values at grid points on the surface of the design object define the surface pressure.

Parameterization application 230 classifies the grids generated at each iteration of the deformation and subdivision steps. Parameterization application 230 classifies the initial generated from the input cubes of the initial polycube and the surrounding exterior cubes as the level-0 grid. Each iteration of the deformation and subdivision steps increases the level by 1. Consequently, parameterization application 230 classifies the grid generated after the first iteration of deformation and subdivision as the level-1 grid. Likewise, parameterization application 230 classifies the grid generated after the second iteration of deformation and subdivision as the level-2 grid. Parameterization application 230 classifies the grid generated after the third iteration of deformation and subdivision as the level-3 grid, and so on.

Further, each grid level includes three types of points: corner points $\mathcal{P}_e$, surface points $\mathcal{P}_e$, and exterior points $\mathcal{P}_e$. Parameterization application 230 classifies the grid points within a particular grid based on the number of input cubes that intersect with the grid point, referred to herein as the valence number. If the valence number for a grid point is an odd number, then parameterization application 230 classifies the grid point as a corner point that is located at the corner of the polycube. If the valence number for a grid point is non-zero and an even number, then parameterization application 230 classifies the grid point as a surface point that is located an edge or a face of the polycube. If the valence number for a grid point is zero, then parameterization application 230 classifies the grid point as an exterior point that is located outside of the polycube.

Parameterization application 230 deforms the level-0 grid such that the corner points and surface points lie on the surface of the design object and the exterior points are on the exterior of the design object. To deform the grid, parameterization application 230 initializes the location of the corner points on the design object. Parameterization application 230 translates and scales the input polycube in the directions of the x, y, and z axes so that the bounding boxes become the same as that of the design object. Parameterization application 230 then projects the corner points onto the surface of the design object. Next, parameterization application 230 computes the locations of surface points and exterior points based on the corner point locations. Finally, parameterization application 230 projects the surface points onto the surface design object.

More specifically, parameterization application 230 projects corner points and surface points in the direction of the normal vector of these points. Parameterization application 230 computes the normal direction for a grid point by averaging the normal vectors of the polycube faces that intersect with the grid point. Parameterization application 230 computes the projection by locating the nearest intersection point to the shape of the design object in the normal direction. The set of projection heights $H_s$ for all the surface points specifies how much these surface points have moved in the normal direction. In this manner, the shape of the design object is defined as the positions of the corner points along with the set of projection heights $H_s$ for all the surface points.

Deformation. Given positions of the corner points, parameterization application 230 deforms the exterior cubes by moving the surface points and exterior points. Parameterization application 230 determines positions of these points as a linear function of the positions of the corner points. For the surface points, which are located on the faces or the edges of the input polycube, parameterization application 230 applies a two-dimensional mean value coordinates (MVC) technique to move the surface points together with the corner points. As a result, each surface point on the edge of the polycube moves based on a linear interpolation of two corner points, referred to herein as endpoints, based on the ratio of the distances from the surface point to the corresponding two endpoints. Further, a surface point on a face of the input polycube moves as a linear function of the corner points that outline the face. For exterior points, parameterization application 230 applies a three-dimensional MVC technique to move the exterior points as a linear function of the position of all the corner points. Via the three-dimensional MVC technique, parameterization application 230 determines the weight $w(p, p_c)$ that transfers the movement of corner point $p_c$ to a movement of a point p. These weights are dependent only on the initial polycube construction and, therefore, parameterization application 230 computes these weights only once.

At this point, parameterization application 230 has constructed a coarse grid such that the boundary between input cubes and exterior cubes is shared with the shape of the design object. Parameterization application 230 now subdivide the exterior cubes to construct further detailed parameterizations of shape of the input cubes within the design object and of the exterior cubes representing the field surrounding the design object. In some embodiments, parameterization application 230 selectively chooses which exterior cubes subdivide. In some embodiments, parameterization application 230 uniformly subdivides the exterior cubes such that all cubes are subdivided into eight children exterior cubes. Parameterization application 230 performs the subdivision on a given parent exterior cube by introducing new subdivision points at the middle points of the edges of the parent exterior cube, at the center of the four corners of the faces of the parent exterior cube, and at the cell center of the parent exterior cube. If a face or edge subdivision point is on the boundary that faces the interior of the design object, parameterization application 230 projects the subdivision point to the surface of the design object in the normal direction. The normal direction is computed as the normal vector on the input polycube at the corresponding location. The normal projection heights at the surface subdivision (ss) points is denoted as $H_{ss}^i$, where i is the subdivision level.

As the user edits or otherwise modifies the shape of the design object, parameterization application 230 continuously optimizes the volumetric grid to minimize the distortion of the deformation grid. Minimizing the grid distortion increases the accuracy and feasibility of the corresponding fluid simulation, and increases the quality of the velocity field representation, and reduces the bias in the design object shape representation. As discussed in further detail above, the locations of the surface points and exterior points in the volumetric grid are dependent on the locations of the corner points. As a result, parameterization application 230 optimizes the volumetric grid by optimizing the locations of the corner points from their initial estimated locations.

Certain approaches for quantifying and correcting parameterization distortion employ finite element method techniques, which are typically too complex for real-time analysis. Instead, by taking advantage of the hierarchy and consistency of the normal vectors of the disclosed approach, parameterization application 230 performs a fast approximation approach to reduce distortion effects in real-time. In particular, parameterization application 230 subdivides the surface of the design object and projects these surfaces in a fixed normal direction onto the undeformed initial polycube. The distortion energy W of a current volumetric grid is defined as the squared sum of the projection heights for all surface points and surface subdivision points, as shown in Equation 1 below:

$$W(P_c) = \sum_{p \in \{p_s, p_{ss}\}} h_p^2 \quad (1)$$

Parameterization application 230 employs projection height as the minimization target because longer projections results in more distortion of the neighboring cubes. Parameterization application 230 minimizes distortion energy W, as given by Equation 1, via a gradient descent technique. Parameterization application 230 moves each surface point as a linear function of to the corresponding corner point. Parameterization application 230 computes the weights $w(p, p_c)$ of the linear movement for a subdivision point by averaging the weights of the parent grid points defined during the subdivision step.

Parameterization application 230 approximates the change in the projection height $h_p$ with movement of the corner points in the direction of the normal vector $\vec{n}_p$. Via this approximation, parameterization application 230 updates each corner point as shown in Equation 2 below:

$$\vec{p}_c = \vec{p}_c - \alpha \sum_{p \in \{p_m, p_{ss}\}} w(p, p_c) \cdot h_p \cdot \vec{n}_p \quad (2)$$

where α is a step length. To normalize the effect of the projection, parameterization application 230 computes α as the ratio between the number of corner points and the number of surface points in the volumetric grid. After performing the gradient decent step, parameterization application 230 again constructs a volumetric grid from the corner points by MVC-based linear deformation, projection, and subdivision. In general, parameterization application 230 efficiently executes the projection step because parameterization application 230 incrementally computes the new intersection point based on the previous intersection point with the design object.

After, parameterizing the shape of the design object and optimizing the volumetric grid, parameterization application 230 transmits the data associated with the design object shape and the volumetric grid to machine learning application 235 for regression analysis. Parameterization application 230 further transmits other data, such as the incoming wind velocity, the mass density, and the fluid viscosity, to machine learning application 235 for the regression analysis.

Machine learning application 235 approximates output parameter vectors associated with a velocity field and surface pressure information based on input parameter vectors including shape data, volumetric grid data, and other data received from parameterization application 230. More specifically, machine learning application 235 receives four parameters as inputs from parameterization application 230: shape data S, incoming wind velocity $V_\infty$, mass density ρ, and viscosity μ. Machine learning application 235 reduces these four parameters into two parameters, normalized shape data S' and a Reynolds number Re, via dimensional analysis. Dimensional analysis is a technique for determining how physical phenomena are parameterized with the minimum number of independent non-dimensional variables. Non-dimensionalization is convenient for machine learning of simulations because non-dimensionalization reduces the number of parameters without loss of accuracy. Furthermore, machine learning application 235 reduces the amount of training data by avoiding redundant, that is, dynamically similar, data. By reducing the number of parameters prior to transmitting the parameters to the neural networks, the size and complexity of the neural network and of the training data for training the neural network. In some embodiments, the size and complexity of a neural network may be a function of the number of the total number of neurons in the neural network. In some embodiments, the size and complexity of a neural network may be a function of the number of the number of neurons in the neural network that have a non-zero weight value.

Accordingly, machine learning application 235 generates non-dimensionalized, or normalized, shape data S' which is uniformly scaled such that the representative length becomes a value of one. Further, machine learning application 235 generates the Reynolds number $Re=\rho LV_\infty/\mu$. Machine learning application 235 scales the shape data is the parameter space by scaling corner point positions $\vec{P}_c$ and projection heights H. Machine learning application 235 defines the representative length as the diagonal length of the bounding box of the input shape data S. From these nondimensionalized input parameters, machine learning application 235 generates non-dimensionalized velocity values as $\vec{v}'=\vec{v}/V_\infty$ and non-dimensionalized and pressure values as $p'=p/(\rho V_\infty^2)$. Machine learning application 235 computes the final velocity and pressure values by scaling velocity values and pressure values by $V_\infty$ and $\rho V_\infty^2$, respectively.

By making the assumption that the design object is a single object placed within a constant fluid flow, certain simplifications can be made to reduce computational complexity of the fluid simulation and, therefore, increase interactivity. As one example, a single object placed within a constant fluid flow is invariant with respect to translation and the volumetric grid moves along with the design object. Therefore, machine learning application 235 can remove the translation component from the input parameters. Machine learning application 235 moves the corner points such that the average position of the corner points rests at the origin of the design object. As a result, the input parameter vector x simplifies to a concatenation of the Reynolds number Re, scaled and translated corner point positions $P_c$, and projection heights $H_s, H_{ss}^1, H_{ss}^2, \ldots$ of the surface points: $x=\{Re, P_c, H_s, H_{ss}^1, H_{ss}^2, \ldots\}$. Machine learning application 235 includes two neural networks, a first neural network that performs a regression to compute the velocity field and a second neural network that performs a regression to compute the surface pressure. Therefore, machine learning application 235 can select different subdivision levels of each of the velocity field neural network and the surface pressure neural network. The neural networks included in machine learning application 235 respectively compute concatenating nondimentionalized output vectors that includes values at the grid points for the velocity fiel7d $y_v=\{V_0, V_1, \ldots\}$ and for the surface pressure $y_p=\{P_0, P_1, \ldots\}$. Machine learning application 235 transmits the computed output vectors for the velocity field $y_v=\{V_0, V_1, \ldots\}$ and for the surface pressure $y_p=\{P_0, P_1, \ldots\}$ to parameterization application 230.

In order to construct the training dataset for the neural networks, machine learning application 235 automatically generates multiple variations of a few example shapes of objects that are roughly similar to the shape of the design object. After parameterizing an example shape, machine learning application 235 deforms the example shape by adding random noise to input parameters. At each subdivision level, machine learning application 235 haves the length of the volumetric grid. Correspondingly, each projection height affects twice as much of the local curvature. As a result, machine learning application 235 reduces the amplitude of noise by half for each successively finer subdivision level in order to avoid training shapes that are too jagged. For each randomly generated training shape, machine learning application 235 solves the Navier-Stokes equation in a highly detailed spatial grid for many time steps to accurately obtain the time-averaged velocity field and pressure field. Machine learning application 235 simulates the fluid flow on a tetrahedral mesh using the finite element method. Machine learning application 235 samples the values of pressure and velocity at the grid points whose location can be obtained from the input parameters. Machine learning application 235 collects T number of pairs of input parameterized shape vectors $x_t$ and corresponding output parameters $y_t$, and stores the training data values on the volumetric grid.

Figure 3:
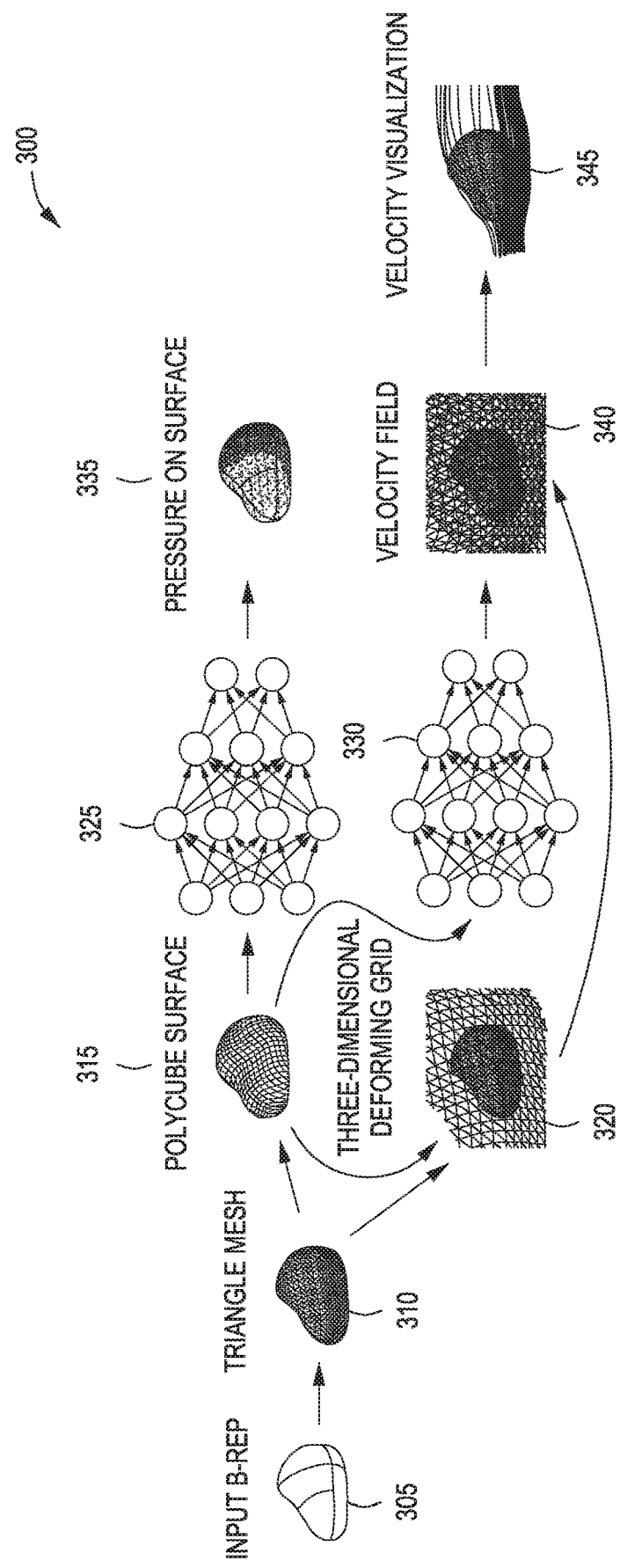
FIG. 3 illustrates a computational pipeline for computing a velocity field model and surface pressure model for a design object, according to various embodiments of the present invention.

FIG. 3 illustrates a computational pipeline 300 for computing a velocity field model 340 and surface pressure model 335 for a design object, according to various embodiments of the present invention. The computational pipeline 300 may be implemented via parameterization application 230 and machine learning application of the fluid simulation system 200 of FIG. 2.

As shown, the computational pipeline 300 starts with a b-rep model 305 associated with the design object. The computational pipeline 300 converts the b-rep model 305 into a triangle mesh 310 by tessellating the faces of the b-rep model 305. The topology of this triangle mesh 310 may change throughout the design process in response to changes and modifications to the topology of the b-rep model 305, such as inserting a new edge in a face of the b-rep model 305. To prepare the shape of the triangle mesh 310 for the pressure neural network 325 and the velocity neural network 330, the computational pipeline 300 parameterizes the triangle mesh 310, where the shape of the design object is represented with a fixed number of variables. In this manner, the computational pipeline 300 computes a polycube surface 315 and a three-dimensional deforming volumetric grid 320. The computational pipeline 300 transmits the polycube surface 315 to two neural networks: the pressure neural network 325 and the velocity neural network 330.

The pressure neural network 325 receives a shape S of the polycube surface 315, the incoming wind speed $V_\infty$, the mass density $\rho$, and viscosity $\mu$ of fluid as inputs. From these inputs, the pressure neural network 325 computes a surface pressure field p 335 of the surface pressure exerted on the grid points of the shape of the design object. Similarly, the velocity neural network 330 receives a shape S of the polycube surface 315, the incoming wind speed $V_\infty$, the mass density $\rho$, and viscosity $\mu$ of fluid as inputs. From these inputs, the velocity neural network 330 computes a velocity field $\vec{v}$ 340 that estimates the velocity at grid points of the region that surrounds the design object. The velocity field $\vec{v}$ 340 is further based on the three-dimensional deforming volumetric grid 320. The computational pipeline 300 then generates the velocity visualization 345 from the velocity field 340. In general, except for fluid flows with very low Reynolds numbers, the fluid flow is non-stationary and is dynamically changing over time. In general, the velocity neural network 330 and the velocity neural network 330 respectively compute a time-averaged velocity field $\vec{v}$ 340 and surface pressure field p 335 of the fluid flow.

Figure 4:
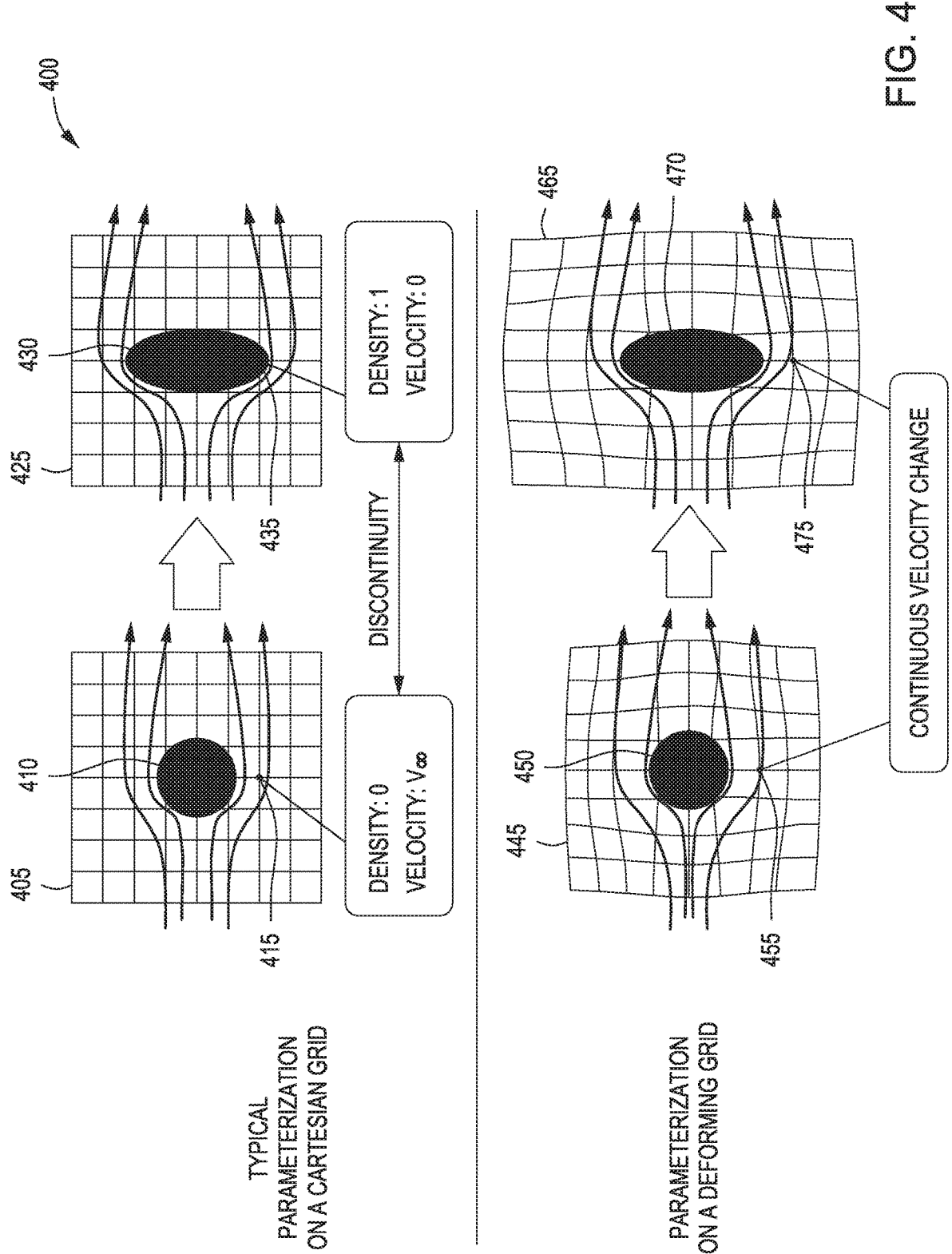
FIG. 4 illustrates an example velocity flow computed on a deforming grid by the parameterization application of FIG. 2 compared to the velocity flow generated on a Cartesian grid, according to various embodiments of the present invention.

FIG. 4 illustrates an example velocity flow 400 computed on a deforming grid by the parameterization application 230 of FIG. 2 compared to the velocity flow generated on a Cartesian grid, according to various embodiments of the present invention.

As shown, design object 410 is placed on Cartesian grid 405. A particular grid point 415 has a density of 0 because the grid point 415 is to the exterior of design object 410. The velocity at grid point 415 is given as $V_\infty$. As the shape of design object 410 transforms into design object 430, the grid remains constant, as shown by Cartesian grid 425. As a result, corresponding grid point 435 has a density of 1 because the grid point 415 is now to the interior of design object 430. Therefore, velocity at grid point 435 is 0. This discontinuity or nonlinearity in the velocity, exemplified by grid point 415 and grid point 435, results in large, complex neural networks needed to model and predict the fluid flow around design object 410 and design object 430.

Consequently, parameterization application 230 parameterizes according to a deforming grid, as exemplified by deforming grid 445 and deforming grid 465. As shown, grid point 455 is exterior to design object 450 with a density of 0 and a particular velocity. As the shape of design object 450 transforms into design object 470, the grid deforms from deforming grid 445 to deforming grid 465. As a result, corresponding grid point 475 is still exterior to design object 470 with a density of 0 and a velocity that is equal or substantially equal to the velocity at grid point 455. As a result, the velocity at corresponding grid points exhibits a velocity change that is continuous or substantially continuous. This continuous or substantially continuous change in the velocity, exemplified by grid point 455 and grid point 475, results in smaller, less complex neural networks needed to model and predict the fluid flow around design object 450 and design object 470.

Figure 5:
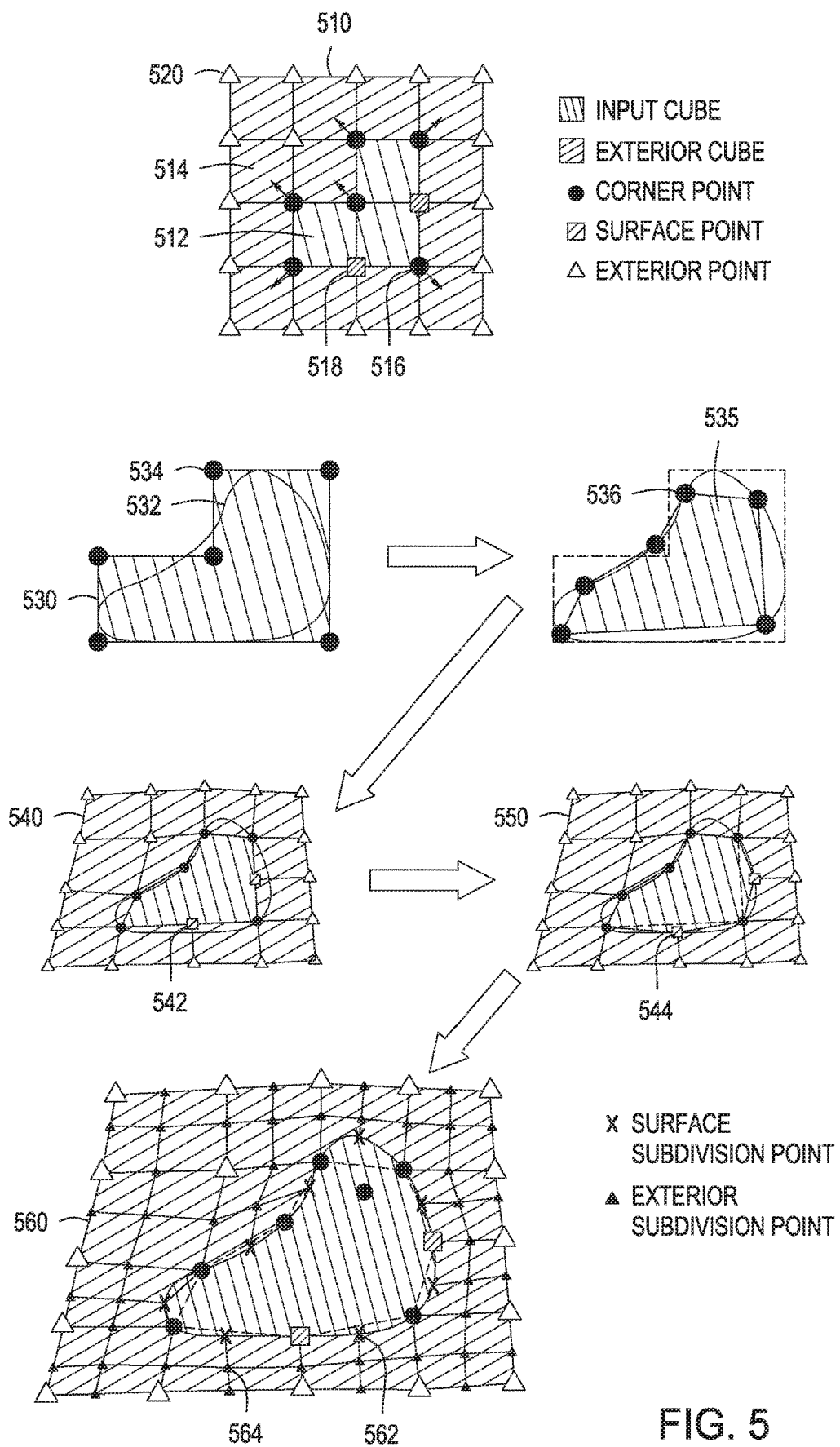
FIG. 5 illustrates an example distortion and subdivision iteration computed by the parameterization application of FIG. 2, according to various embodiments of the present invention.

FIG. 5 illustrates an example distortion and subdivision iteration computed by the parameterization application 230 of FIG. 2, according to various embodiments of the present invention. The illustrations are shown in two-dimensions for ease of understanding. However, the polycubes, design objects, and volumetric grids illustrated in FIG. 5 are understood to be three-dimensional, as further described herein.

As shown, an initial grid 510 is a bounding box that surrounds an initial polycube where each cube is classified as an input cube that is interior to the polycube, such as cube 512, or an exterior cube that is exterior to the polycube, such as cube 514. In addition, each grid point of initial grid 510 is classified as a corner point, a surface point, or an exterior point, based on the valence number. If the valence number for a grid point is an odd number, such as grid point 516, then parameterization application 230 classifies the grid point as a corner point that is located at the corner of the polycube. If the valence number for a grid point is non-zero and an even number, such as grid point 518, then parameterization application 230 classifies the grid point as a surface point that is located an edge or a face of the polycube. If the valence number for a grid point is zero, such as grid point 520, then parameterization application 230 classifies the grid point as an exterior point that is located outside of the polycube.

The initial polycube 530 is then overlaid onto the shape of the design object 532. Each corner point of the initial polycube 530 is then moved in the normal direction to lie on the surface of the shape of the design object 532. For example, corner point 534 is moved in the normal direction to corner point 536. Moving all corner points in this manner results in polycube 535. Distortion grid 540 is computed by distorting initial grid 510. More specifically, the grid points on distortion grid 540 are conformed to the new locations of the corner points of polycube 535. Distortion grid 550 is computed by further distorting distortion grid 540. More specifically, each surface point is moved to lie on the surface of the shape of the design object 532. The distortion grid 550 is then subdivided to generate distortion grid 560. The new grid points in distortion grid 550 are positioned as further described herein. New grid points that lie on the surface of the shape of the design object 532, such as grid point 562, are classified as surface subdivision points. New grid points that are exterior to the surface of the shape of the design object 532, such as grid point 564, are classified as exterior subdivision points.

Figure 6:
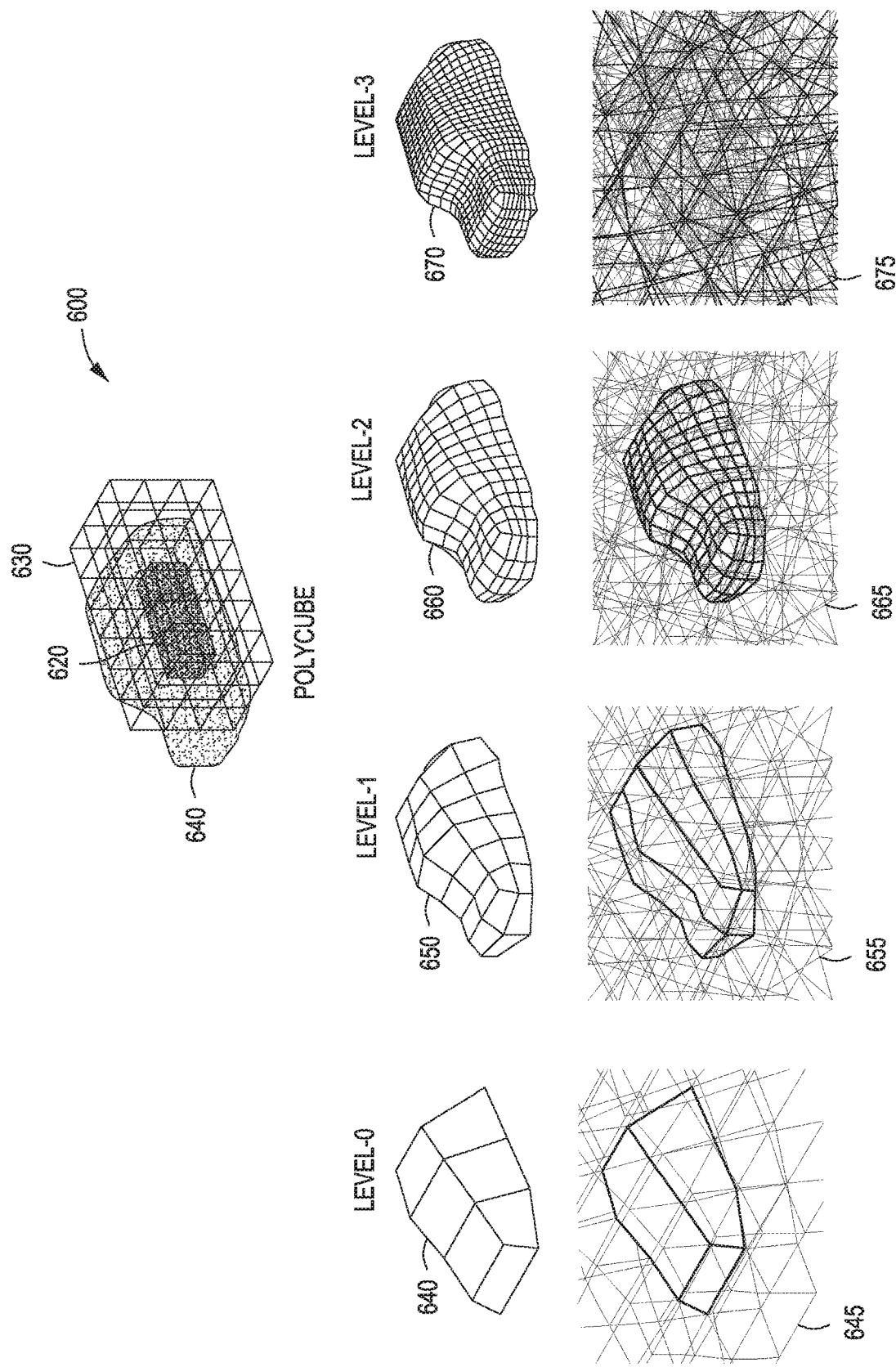
FIG. 6 illustrates an example parameterization computed by the parameterization application of FIG. 2, according to various embodiments of the present invention.

FIG. 6 illustrates an example parameterization 600 computed by the parameterization application 230 of FIG. 2, according to various embodiments of the present invention. As shown, a shape 610 of a design object is overlaid with an initial polycube 620, and an initial grid 630 is generated. The initial grid 630 forms a bounding box that surround the initial polycube 620. Parameterization application 230 performs a first iteration of distortion and subdivision to compute level-0 polycube 640 and level-0 distortion grid 645. Similarly, parameterization application 230 performs a second iteration of distortion and subdivision to compute level-1 polycube 650 and level-1 distortion grid 655. Parameterization application 230 performs a third iteration of distortion and subdivision to compute level-2 polycube 660 and level-2 distortion grid 665. Finally, parameterization application 230 performs a fourth iteration of distortion and subdivision to compute level-3 polycube 670 and level-3 distortion grid 675. Parameterization application 230 continues to perform iterations of distortion and subdivision until one or more criteria are met. Such criteria include, without limitation, performing a fixed number of iterations, performing iterations until a sufficient level of detail is compute, and performing iterations until the error between the shape 610 of a design object and the current polycube is below a specified threshold level.

Figure 7:
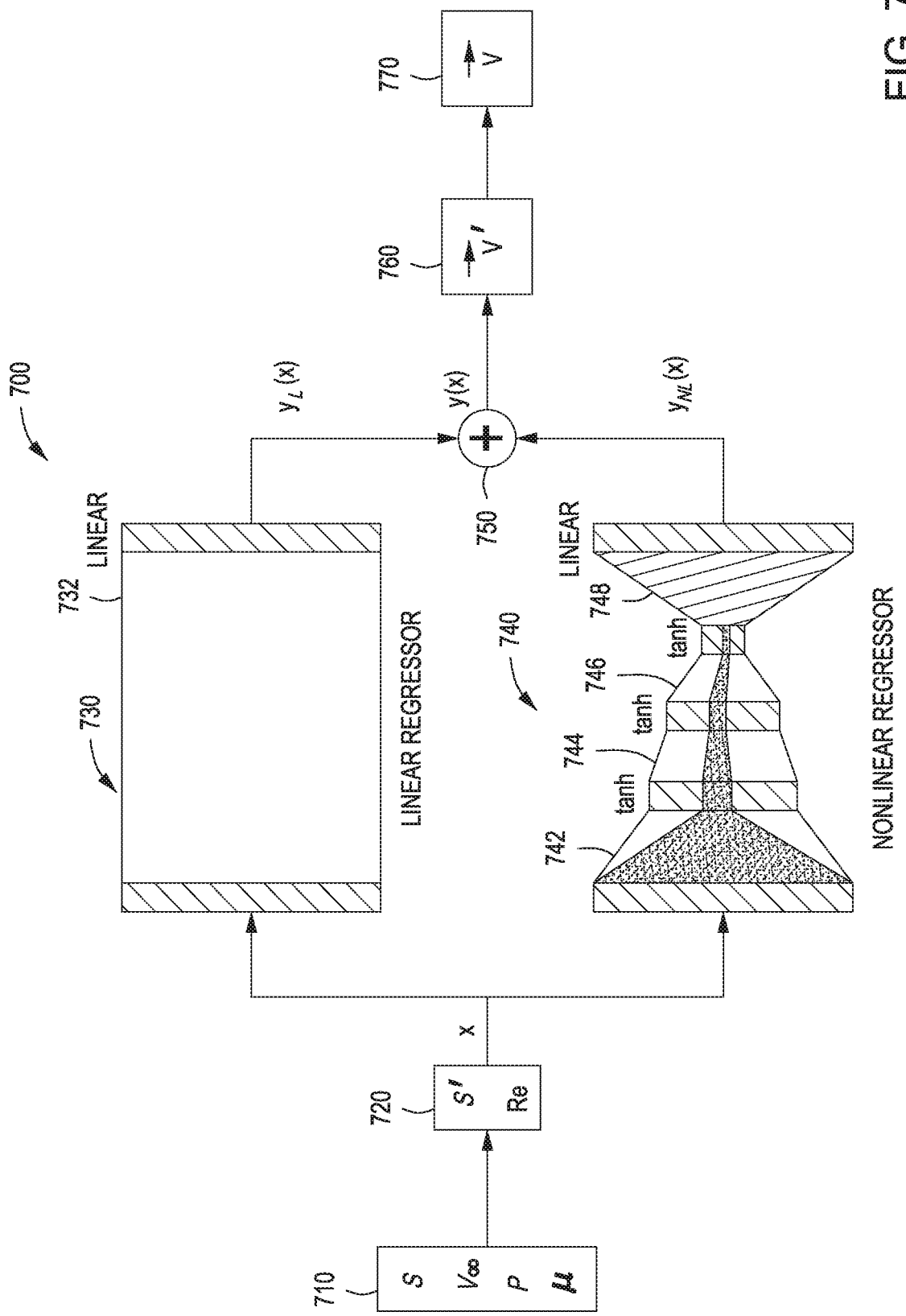
FIG. 7 illustrates a more detailed view of a neural network included in the machine learning application of FIG. 2, according to various embodiments of the present invention.

FIG. 7 illustrates a more detailed view of a neural network 700 included in the machine learning application 235 of FIG. 2, according to various embodiments of the present invention. As shown, neural network 700 included input vectors 710, modified input vectors 720, a linear regressor 730, a nonlinear regressor 740, a combiner 750, initial output vectors 760, and final output vectors 770.

Each input vector 710 includes four parameters as inputs from parameterization application 230: shape data S, incoming wind velocity $V_\infty$, mass density $\rho$, and viscosity $\mu$. These input vectors are reduced to two parameters via dimensional analysis to generated modified input parameters 720 with two parameters, normalized shape data S' and a Reynolds number Re. The modified input parameters 720 are transmitted to two regressors, the linear regressor 730 and the nonlinear regressor 740. Combiner 750 combines the output of the linear regressor 730 and the nonlinear regressor 740 to generate non-dimensionalized output vectors 760, such as non-dimensionalized velocity values as $\vec{v}'=\vec{v}/V_\infty$ and non-dimensionalized and pressure values as $p'=p/(\rho V_\infty^2)$. Finally, the non-dimensionalized output vectors 760 are scaled to generate final output vectors 770. More specifically, non-dimensionalized velocity values $\vec{v}'$ and non-dimensionalized and pressure values p' are scaled by $V_\infty$ and $\rho V_\infty^2$, respectively, to generate final output vectors 770.

In operation, neural network 700 constructs a function $y(x_t)$ which approximates the output training vectors $y_t$ from the input of training vectors $x_t$ via a regression technique. To perform the regression technique, neural network 700 minimizes the squared error E between the training output vectors $y_t$ and the function $y(x_t)$ as shown in Equation 3 below:

$$E = \sum_{t=0}^{T} \|y_t - y(x_t)\|^2 \qquad (3)$$

The input dimension of $y(x_t)$ may be denoted as $M_{in}$ and the output dimension of $y(x_t)$ may be denoted as $M_{out}$. These input and output dimensions depend on the subdivision levels, and are typically very large, ranging from several hundred to tens of thousands. Because the input parameters and output parameters are constructed to provide a smooth relationship, one possible approach to regress such a high dimensional function is the multivariate Taylor expansion. However, the coefficients of higher order Taylor expansion consume significant amounts of memory as the input dimension and output dimension increase. For example, the coefficient matrix of quadratic terms would have a dimension $M_{out} \times M_{in} \times M_{in}$. In order to reduce the size and complexity of the neural network, linear and nonlinear components are computed separately, where the components higher than the linear term are approximated using a simplified neural network regression model as now described in further detail.

The linear and nonlinear components are respectively computed by the linear regressor 730 and the nonlinear regressor 740.

The linear regressor 730 has a linear output layer 732 with linear activation functions and does not have hidden layers. The nonlinear regressor 740 has three hidden layers 742, 744, and 746 with hyperbolic tangent activation functions, as well as a linear output layer 748 with linear activation functions. The number of neurons in hidden layer 746 is denoted as $\beta$. The number of neurons in the other hidden layers 742 and 744 is typically an integral multiple of $\beta$, such as $2\beta$ or $3\beta$.

To train the linear regressor 730 and the nonlinear regressor 740, neural network 700 analytically estimates the weights of the linear regression for the linear regressor 730 in order to minimize the squared error. Then, the residual of the linear regression is set as the training output for the nonlinear regressor 740. Stated another way, the nonlinear regressor 740 learns the relationship between input vectors $x_t$ and the residual $r_t=y_t-y_L(x_t)$, where the $y_L(x_t)$ is the linear regression function and $t \in T$. In some embodiments, convergence from a random initialization of weights may be difficult to obtain via the conventional backpropagation method, particularly for error functions that exhibit poor local minima characteristics. Consequently, the initial weights of the neural network 700 are selected to efficiently "warm start" the backpropagation, as now described in further detail.

More specifically, neural network 700 analytically estimates the neuron weights of the linear output layer 748 via a singular value decomposition (SVD) approach. The residual from the estimation of the neuron weights of the linear output layer 748 is a matrix denoted R with dimension $T \times M_{out}$, where the rows of matrix R contain the residual of the linear regressor $r_t$. Neural network performs an SVD operation on matrix R to discover the $\beta$ number of $M_{out}$ dimensional bases that approximate matrix R as closely as possible. For each training residual $r_t$, a $\beta$-dimensional coefficient $s_t$ exists that describes how much each basis is activated. Neural network 700 scales these bases such that the coefficient $s_t$ is within the range of the hyperbolic tangent, that is, between minus one and one. These bases are set as the initial estimation of the weight of the linear output layer 748 neuron weight.

Then, for all $\beta$ neurons in the outermost hidden layer 746, neural network 700 divides the other hidden layers 742 and 744 into a $\beta$ number of independent sub-neural networks. By ignoring the cross-talk between neurons in the sub-neural networks, neural network 700 facilitates learning of the weights for hidden layers 742, 744, and 746. Then, neural network 700 employs a Levenberg-Marquardt technique to iteratively optimize the weights for hidden layers 742, 744, and 746. From the initial weights, neural network 700 performs batch backpropagation for the entire nonlinear regressor 740 to further optimize the weights.

Figure 8:
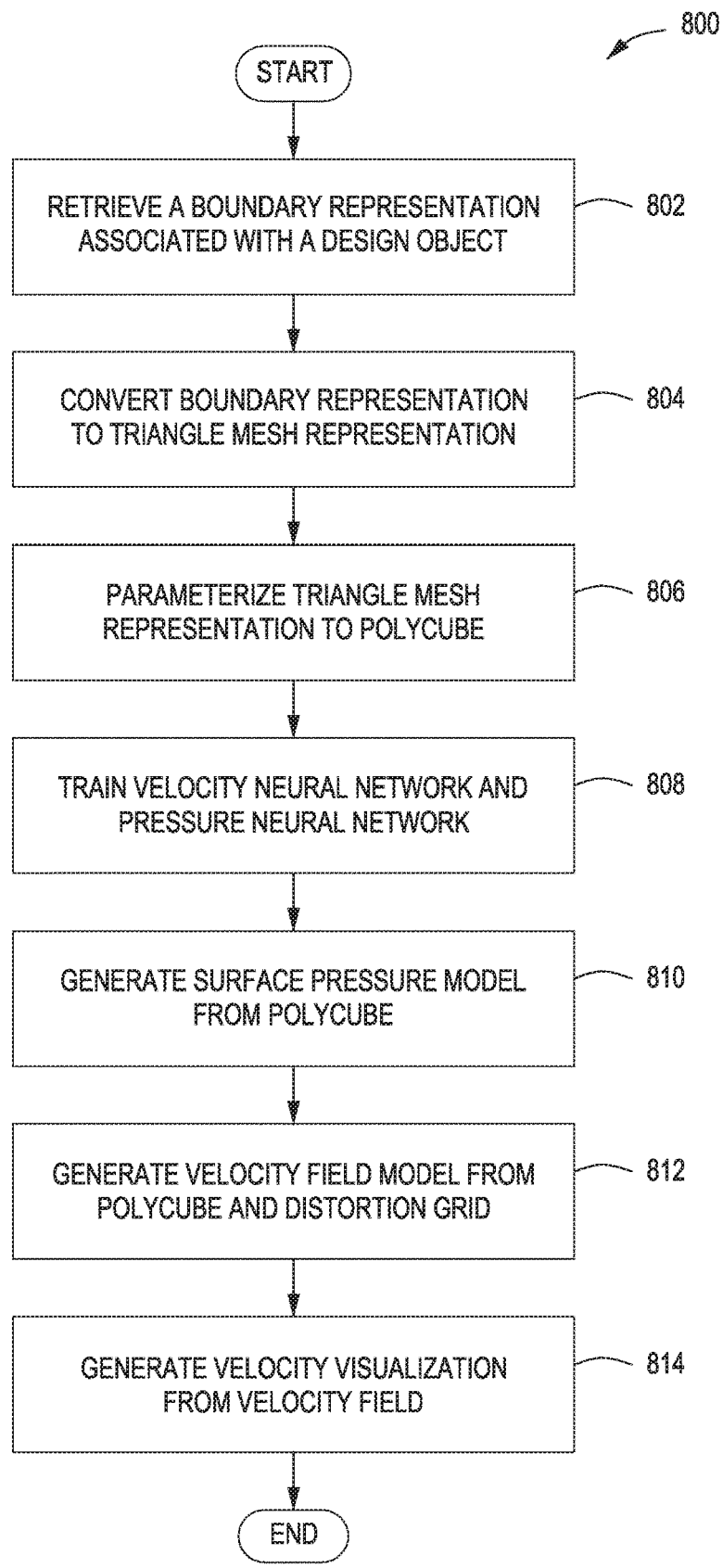
FIG. 8 is a flow diagram of method steps for simulating a three-dimensional fluid flow around a design object, according to various embodiments of the present invention.

FIG. 8 is a flow diagram of method steps for simulating a three-dimensional fluid flow around a design object, according to various embodiments of the present invention. Although the method steps are described in conjunction with the systems of FIGS. 1-7, persons of ordinary skill in the art will understand that any system configured to perform the method steps, in any order, is within the scope of the invention.

As shown, a method 800 begins at step 802, where parameterization application 230 executing on fluid simulation system 200 retrieves a boundary representation (b-rep) model associated with a design object. The b-rep model may be an initial b-rep model retrieved from data store 240 or storage 204. Alternatively, the b-rep model may be an initial b-rep model that has been edited or otherwise modified by a user.

At step 804, parameterization application 230 converts the b-rep model into a triangle mesh representation by tessellating the faces of the b-rep model. The topology of this triangle mesh representation may change throughout the design process in response to changes and modifications to the topology of the b-rep model, such as inserting a new edge in a face of the b-rep model.

At step 806, parameterization application 230 prepares the shape of the triangle mesh representation for the neural networks in machine learning application 235 by parameterizing the triangle mesh representation. In particular, parameterization application 230 generates a polycube surface and a three-dimensional deforming volumetric grid. Parameterization application 230 iteratively distorts and subdivides polycube surface and a three-dimensional deforming volumetric grid until one or more criteria are met. Such criteria include, without limitation, performing a fixed number of iterations, performing iterations until a sufficient level of detail is generated, and performing iterations until the error between the shape of the design object and the current polycube is below a specified threshold level.

At step 808, machine learning application 235 executing on fluid simulation system 200 trains two neural networks based on example input shapes that approximate the shape of the design object. A first neural network is a pressure neural network that generates a model of the surface pressure exerted on the design object. A second neural network is a velocity neural network that generates a velocity field that surrounds the design object. Machine learning application 235 trains a linear regressor and a nonlinear regressor in each of the pressure neural network and the velocity neural network.

At step 810, the pressure neural network included in machine learning application 235 computes the surface pressure model based on the polycube surface. In particular, the pressure neural network receives a shape S of the polycube surface, the incoming wind speed $V_\infty$, the mass density p, and viscosity p of fluid as inputs. From these inputs, the pressure neural network generates a surface pressure field p of the surface pressure exerted on the grid points of the shape of the design object.

At step 812, the velocity neural network included in machine learning application 235 computes the velocity field model that surrounds the design object. In particular, the velocity neural network receives a shape S of the polycube surface 315, the incoming wind speed $V_\infty$, the mass density $\rho$, and viscosity $\mu$ of fluid as inputs. From these inputs, the velocity neural network 330 generates a velocity field $\vec{v}$ 340 that estimates velocity at grid points of the region that surrounds the design object. The velocity field $\vec{v}$ 340 is further based on the three-dimensional deforming volumetric grid 320.

At step 814, machine learning application 235 generates a velocity visualization from the velocity field. In general, except for fluid flows with very low Reynolds numbers, the fluid flow is non-stationary and is dynamically changing over time. In general, the pressure neural network and the velocity neural network respectively generate a time-averaged surface pressure field p and velocity field $\vec{v}$ of the fluid flow associated with the design object.

The method 800 then terminates.

In sum, a fluid simulation system employs data-driven techniques for analyzing and simulating fluid flows around three-dimensional design objects. The fluid simulation system receives a three-dimensional shape of a design object, incoming wind speed, mass density, and fluid viscosity. The system converts the shape of the design object into a triangle mesh and parameterizes the shape, based on a polycube map, in order to prepare the shape for one or more neural networks. The shape is parameterized in real-time, so that changes in fluid flow are interactively computed as the shape of the design object is changed.

A machine learning architecture receives the parameterized three-dimensional shape and predicts a corresponding velocity field and a pressure field in return for a three-dimensional shape input. The machine learning architecture includes two neural networks, a first neural network for predicting the velocity field surrounding the design object and a second neural network for predicting the pressure on the surface of the design object. Each neural network includes a linear regressor and a separate non-linear regressor for improved accuracy.

At least one advantage of the disclosed techniques is that CFD simulation of fluid flows is computed at interactive speeds. As a result, engineers and designers can visualize the aerodynamic effects of changes to the shape of a design object in real-time or near real-time. In this manner, engineers and designers can more efficiently optimize the shape of a design object to meet particular aerodynamic design goals, relative to prior techniques.

1. In some embodiments, a computer-implemented method for simulating a three-dimensional fluid flow comprises: parameterizing a first representation of a design object to compute a first polycube representation; computing a first distortion grid based on the first polycube representation; computing, via a first neural network, a surface pressure model based on the first polycube representation; computing, via a second neural network, a velocity field model based on the first polycube representation and the first distortion grid; and generating a visualization of the surface pressure model and the velocity field model for display on a display device.

2. The method of clause 1, wherein parameterizing the first representation comprises: generating a bounding box that surrounds the first polycube representation; determining that a cube lies within the bounding box and is internal to the first polycube representation; and classifying the cube as an input cube.

3. The method of clause 1 or clause 2, wherein parameterizing the first representation comprises: generating a bounding box that surrounds the first polycube representation; determining that a cube lies within the bounding box and is external to the first polycube representation; and classifying the cube as an exterior cube.

4. The method of any of clauses 1-3, wherein the first distortion grid includes a first plurality of grid points, parameterizing the first representation comprises computing a first valence value for a first grid point included in the first plurality of grid points, and the first valence value represents a number of faces of the first polycube representation that intersect with the first grid point.

5. The method of any of clauses 1-4, wherein parameterizing the first representation further comprises: subdividing the first distortion grid to include a second plurality of grid points; determining that a second grid point included in the second plurality of grid points lies on a surface of the design object; and classifying the second grid point as a surface subdivision point.

6. The method of any of clauses 1-5, wherein parameterizing the first representation further comprises: subdividing the first distortion grid to include a second plurality of grid points; determining that a second grid point included in the second plurality of grid points lies exterior to the design object; and classifying the second grid point as an exterior subdivision point.

7. In some embodiments, a non-transitory computer-readable storage medium includes instructions that, when executed by a processor, cause the processor to simulate a three-dimensional fluid flow by performing the steps of: parameterizing a first representation of a design object to compute a first polycube representation; computing a first distortion grid based on the first polycube representation; computing, via a neural network, a velocity field model and a surface pressure model based on the first polycube representation and the first distortion grid; and generating a visualization of the surface pressure model and the velocity field model for display on a display device.

8. The non-transitory computer-readable storage medium of clause 7, wherein the first distortion grid includes a first plurality of grid points, parameterizing the first representation comprises computing a first valence value for a first grid point included in the first plurality of grid points, and the first valence value represents a number of faces of the first polycube representation that intersect with the first grid point.

9. The non-transitory computer-readable storage medium of clause 7 or clause 8, wherein parameterizing the first representation further comprises determining that the first valence value is an odd number; and classifying the first grid point as a corner point.

10. The non-transitory computer-readable storage medium of any of clauses 7-9, wherein parameterizing the first representation further comprises determining that the first grid point does not lie on any surface of the design object, and moving a location of the first grid point in a first normal direction until the first grid point lies on a surface of the design object.

11. The non-transitory computer-readable storage medium of any of clauses 7-10, wherein parameterizing the first representation further comprises: classifying a second point included in the first plurality of grid points as a surface point; determining that the second grid point does not lie on any surface of the design object; and moving a location of the second grid point until the second grid point lies on the surface of the design object based a ratio of a first distance between the second grid point and the first grid point and a second distance between the second grid point and a third grid point.

12. The non-transitory computer-readable storage medium of any of clauses 7-11, wherein parameterizing the first representation further comprises: classifying a second grid point included the first plurality of grid points as an exterior point; and moving a location of the second grid point as a linear function of a location of the first grid point.

13. The non-transitory computer-readable storage medium of any of clauses 7-12, wherein parameterizing the first representation further comprises determining that the first valence value is a non-zero even number, and classifying the first grid point as a surface point.

14. The non-transitory computer-readable storage medium of any of clauses 7-13, wherein parameterizing the first representation further comprises determining that the first valence value is zero, and classifying the first grid point as an exterior point.

15. The non-transitory computer-readable storage medium of any of clauses 7-14, further comprising generating a visualization of the surface pressure model and the velocity field model for display on a display device.

16. In some embodiments, a computing device comprises: a memory that includes a parameterization application and a machine learning application; and a processor that is coupled to the memory, wherein, when the processor executes the parameterization application, the processor is configured to: parameterize a first representation of a design object to compute a first polycube representation; and compute a first distortion grid based on the first polycube representation, and wherein, when the processor executes the machine learning application, the processor is configured to: compute a surface pressure model based on the first polycube representation; and compute a velocity field model based on the first polycube representation and the first distortion grid.

17. The computing device of clause 16, wherein the machine learning application comprises a neural network that includes a linear regressor for computing a linear component of the surface pressure model and a nonlinear regressor for computing a nonlinear component of the surface pressure model.

18. The computing device of clause 16 or clause 17, wherein the machine learning application comprises a neural network that includes a linear regressor for computing a linear component of the velocity field model and a nonlinear regressor for computing a nonlinear component of the velocity field model.

19. The computing device of any of clauses 16-18, wherein: the nonlinear regressor includes a plurality of hidden layers; a first hidden layer included in the plurality of hidden layers comprises a first number of neurons that include a first set of weights related to the nonlinear component; a second hidden layer included in the plurality of hidden layers comprises a second number of neurons that include a second set of weights related to the nonlinear component; and the first number of neurons is an integral multiple of the second number of neurons.

20. The computing device of any of clauses 16-19, wherein computing the velocity field model and the surface pressure model comprises: receiving a first parameter set associated with the design object; and converting the first parameter set to a second parameter set associated with the design object; wherein a number of parameters included in the second parameter set is less than a number of parameters included in the first parameter set to reduce a number of neurons included in the neural network.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for simulating a three-dimensional fluid flow, the method comprising:
    determining an initial polycube model approximating a shape of a design object;
    performing, via a parameterization application, a parameterization process that parameterizes the shape of the design object by:
        generating an initial grid that includes a bounding box that surrounds the initial polycube model;
        computing a first polycube representation of the design object by deforming the initial polycube model until a shape of the initial polycube model matches the design object;
        computing a first distortion grid by iteratively deforming the bounding box based on a shape of the first polycube representation, wherein the first distortion grid comprises a deforming volumetric grid that tracks modifications to the initial polycube model as the initial polycube model is deformed to match the shape of the design object; and
    generating, via a first neural network, a velocity field model based on the first polycube representation and the first distortion grid; and
    generating a visualization of the velocity field model for display on a display device.

2. The method of claim 1, wherein computing the first polycube representation further comprises:
    determining that a cube lies within the initial grid and is internal to the first polycube representation; and
    classifying the cube as an input cube.

3. The method of claim 1, further comprising:
    performing, in a shape editing interface, a manipulation that changes the shape of the design object; and
    updating, via the parameterization process, the visualization of the velocity field model in real-time or near real-time based on the manipulation.

4. The method of claim 1, wherein the first distortion grid includes a first plurality of grid points, and wherein computing the first polycube representation further comprises computing a first valence value for a first grid point included in the first plurality of grid points, and the first valence value represents a number of faces of the first polycube representation that intersect with the first grid point.

5. The method of claim 4, wherein computing the first polycube representation further comprises:
    subdividing the first distortion grid to include a second plurality of grid points;
    determining that a second grid point included in the second plurality of grid points lies on a surface of the design object; and
    classifying the second grid point as a surface subdivision point.

6. The method of claim 4, wherein computing the first polycube representation further comprises:
    subdividing the first distortion grid to include a second plurality of grid points;
    determining that a second grid point included in the second plurality of grid points lies exterior to the design object; and
    classifying the second grid point as an exterior subdivision point.

7. One or more non-transitory computer-readable storage media including instructions that, when executed by one or more processors, cause the one or more processors to simulate a three-dimensional fluid flow by performing steps of:

determining an initial polycube model approximating a shape of a design object;
   performing, via a parameterization application, a parameterization process that parameterizes the shape of the design object by:
      generating an initial grid comprising a bounding box that surrounds the initial polycube model;
      computing a first polycube representation of the design object by deforming the initial polycube model until a shape of the initial polycube model matches the design object;
      computing a first distortion grid by iteratively deforming the bounding box based on a shape of the first polycube representation; and
      generating, via a first neural network, a surface pressure model based on the first polycube representation and the first distortion grid; and
   generating a visualization of the surface pressure model for display on a display device.

8. The non-transitory computer-readable storage media of claim 7, wherein computing the first polycube representation comprises computing a first valence value for a first grid point included in a first plurality of grid points, and the first valence value represents a number of faces of the first polycube representation that intersect with the first grid point.

9. The non-transitory computer-readable storage media of claim 8, wherein computing the first polycube representation further comprises determining that the first valence value is an odd number; and classifying the first grid point as a corner point.

10. The non-transitory computer-readable storage media of claim 8, further comprising:
   updating, via the parameterization process, the visualization in real-time or near real-time in response to changing the shape of the design object in a shape editing interface.

11. The non-transitory computer-readable storage media of claim 8, wherein computing the first polycube representation further comprises:
   classifying a second grid point included in the first plurality of grid points as a surface point;
   determining that the second grid point does not lie on any surface of the design object; and
   moving a location of the second grid point until the second grid point lies on the surface of the design object based a ratio of a first distance between the second grid point and the first grid point and a second distance between the second grid point and a third grid point.

12. The non-transitory computer-readable storage media of claim 8, wherein computing the first polycube representation further comprises:
   classifying a second grid point included the first plurality of grid points as an exterior point; and
   moving a location of the second grid point as a linear function of a location of the first grid point.

13. The non-transitory computer-readable storage media of claim 8, wherein computing the first polycube representation further comprises:
   determining that the first valence value is a non-zero even number; and
   classifying the first grid point as a surface point.

14. The non-transitory computer-readable storage media of claim 8, wherein computing the first polycube representation further comprises:
   determining that the first valence value is zero; and
   classifying the first grid point as an exterior point.

15. A computing device, comprising:
   a memory that includes instructions; and
   a processor that is coupled to the memory and, when executing the instructions:
      determines an initial polycube model approximating a shape of a design object;
      performs, via a parameterization application, a parameterization process that parameterizes the shape of the design object, wherein the parameterization process:
         generates an initial grid that includes a bounding box that surrounds the initial polycube model;
         computes a first polycube representation of the design object by deforming the initial polycube model until a shape of the initial polycube model matches the design object;
         computes a first distortion grid by iteratively deforming the bounding box based on a shape of the first polycube representation, wherein the first distortion grid comprises a deforming volumetric grid that tracks modifications to the initial polycube model as the initial polycube model is deformed to match the shape of the design object; and
         generates, via a first neural network, at least one of a surface pressure model or a velocity field model based on the first polycube representation and the first distortion grid; and
      generates a visualization of the at least one of the surface pressure model or the velocity field model for display on a display device.

16. The computing device of claim 15, wherein at least a portion of the instructions are included in a machine learning application comprising the first neural network.

17. The computing device of claim 16, wherein the surface pressure model is computed, and wherein the first neural network includes a linear regressor for computing a linear component of the surface pressure model and a nonlinear regressor for computing a nonlinear component of the surface pressure model.

18. The computing device of claim 16, wherein the velocity field model is computed, and wherein the first neural network includes a linear regressor for computing a linear component of the velocity field model and a nonlinear regressor for computing a nonlinear component of the velocity field model.

19. The computing device of claim 18, wherein:
   the nonlinear regressor includes a plurality of hidden layers;
   a first hidden layer included in the plurality of hidden layers comprises a first number of neurons that include a first set of weights related to the nonlinear component;
   a second hidden layer included in the plurality of hidden layers comprises a second number of neurons that include a second set of weights related to the nonlinear component; and
   the first number of neurons is an integral multiple of the second number of neurons.

20. The computing device of claim 18, wherein computing the at least one of the surface pressure model or the velocity field model comprises:

receiving a first parameter set associated with the design object; and converting the first parameter set to a second parameter set associated with the design object;

wherein a number of parameters included in the second parameter set is less than a number of parameters included in the first parameter set to reduce a number of neurons included in the first neural network.

* * * * *